United States Patent
Ghaemi et al.

(10) Patent No.: US 11,048,695 B2
(45) Date of Patent: Jun. 29, 2021

(54) CONTEXT-AWARE DATA COMMENTING SYSTEM

(71) Applicant: SAP SE, Walldorf (DE)

(72) Inventors: Houman Ghaemi, Vancouver (CA); Bill (Peng Hong) Chen, Vancouver (CA); Steve Norton, Burnaby (CA); Seyedhassan Mousavijavardi, Vancouver (CA); Derrick Wan, Vancouver (CA)

(73) Assignee: SAP SE, Walldorf (DE)

( * ) Notice: Subject to any disclaimer, the term of this patent is extended or adjusted under 35 U.S.C. 154(b) by 283 days.

(21) Appl. No.: 15/702,409

(22) Filed: Sep. 12, 2017

(65) Prior Publication Data

US 2019/0079969 A1 Mar. 14, 2019

(51) Int. Cl.

| | |
|---|---|
| *G06F 16/242* | (2019.01) |
| *G06F 21/62* | (2013.01) |
| *G06F 16/248* | (2019.01) |
| *G06F 16/2455* | (2019.01) |
| *G06F 16/9535* | (2019.01) |
| *G06F 40/169* | (2020.01) |
| *G06F 40/177* | (2020.01) |

(52) U.S. Cl.
CPC ........ *G06F 16/2428* (2019.01); *G06F 16/248* (2019.01); *G06F 16/2455* (2019.01); *G06F 16/9535* (2019.01); *G06F 21/6218* (2013.01); *G06F 40/169* (2020.01); *G06F 40/177* (2020.01); *G06F 2221/2141* (2013.01)

(58) Field of Classification Search
CPC ..... G06F 3/0481–0489; G06F 16/2428; G06F 16/248; G06F 16/2455; G06F 21/6218; G06F 40/169; H04L 63/20; H04L 63/10; H04L 47/70
See application file for complete search history.

(56) References Cited

U.S. PATENT DOCUMENTS

| | | | |
|---|---|---|---|
| 6,212,549 B1 * | 4/2001 | Page | G06Q 10/06 709/205 |
| 7,783,966 B2 * | 8/2010 | Mitsui | G06F 17/246 715/212 |
| 7,937,401 B2 * | 5/2011 | Pasumansky | G06F 16/283 707/759 |
| 8,239,751 B1 * | 8/2012 | Rochelle | G06F 17/246 715/220 |
| 8,307,119 B2 * | 11/2012 | Rochelle | G06Q 10/10 709/248 |

(Continued)

*Primary Examiner* — Steven B Theriault
(74) *Attorney, Agent, or Firm* — Buckley, Maschoff & Talwalkar LLC

(57) ABSTRACT

A system includes reception of a first query of a transaction table from a first client system, generation of a first result set based on the first query, transmission of the first result set to the first client system, reception of a first subset of the first result set from the first client system, the first subset of the first result set associated with a first user, determination of whether to present a first stored comment to the first user based on the first subset of the first result set, a first context associated with the first stored comment, and data security information associated with the first user, and, if it is determined to present the first stored comment to the first user, transmission of the first stored comment to the first client system.

17 Claims, 10 Drawing Sheets

(56) References Cited

U.S. PATENT DOCUMENTS

| | | | | |
|---|---|---|---|---|
| 8,307,409 B2* | 11/2012 | Takahashi | G06F 21/604 | 726/4 |
| 8,312,508 B2* | 11/2012 | Ebata | G06F 21/6227 | 726/10 |
| 8,341,512 B2* | 12/2012 | Sol | G06F 40/18 | 715/212 |
| 8,578,399 B2* | 11/2013 | Khen | G06F 9/541 | 719/330 |
| 8,584,008 B1* | 11/2013 | Dulaney | G06F 17/211 | 715/212 |
| 8,886,673 B2* | 11/2014 | Iorio | G06F 12/1458 | 707/783 |
| 9,263,084 B1* | 2/2016 | Amacker | H04N 21/44218 | |
| 9,286,597 B2* | 3/2016 | Rampson | G06F 40/197 | |
| 9,349,022 B2* | 5/2016 | Povalyayev | H04L 63/102 | |
| 9,747,270 B2* | 8/2017 | Campbell | G06F 3/04883 | |
| 9,798,889 B1* | 10/2017 | Karpel | G06F 21/6227 | |
| 9,811,683 B2* | 11/2017 | Adams | G06F 21/6218 | |
| 9,953,178 B2* | 4/2018 | Umbehocker | G06F 21/604 | |
| 10,133,720 B2* | 11/2018 | Rothschiller | G06F 40/106 | |
| 10,152,523 B2* | 12/2018 | Zaidi | G06F 16/248 | |
| 10,152,526 B2* | 12/2018 | Adams | G06F 16/78 | |
| 10,216,494 B2* | 2/2019 | Stachura | G06F 8/30 | |
| 10,303,894 B2* | 5/2019 | Ahmed | G06F 21/6227 | |
| 10,552,530 B1* | 2/2020 | Karpel | G06F 40/18 | |
| 2002/0077803 A1* | 6/2002 | Kudoh | G06F 21/6218 | 704/1 |
| 2003/0182621 A1* | 9/2003 | Mazza | G06F 16/9558 | 715/226 |
| 2003/0187848 A1* | 10/2003 | Ghukasyan | G06F 21/6227 | |
| 2004/0133567 A1* | 7/2004 | Witkowski | G06F 16/283 | |
| 2004/0139043 A1* | 7/2004 | Lei | G06F 21/6227 | |
| 2004/0153992 A1* | 8/2004 | Molina-Moreno | G06F 8/35 | 717/105 |
| 2004/0260702 A1* | 12/2004 | Cragun | G06F 16/954 | |
| 2004/0268259 A1* | 12/2004 | Rockey | G06F 9/451 | 715/708 |
| 2005/0060342 A1* | 3/2005 | Farag | G06F 16/252 | |
| 2005/0246338 A1* | 11/2005 | Bird | G06F 21/6227 | |
| 2005/0262572 A1* | 11/2005 | Yoneyama | G06F 21/6218 | 726/27 |
| 2006/0095832 A1* | 5/2006 | Serra | G06F 17/246 | 715/209 |
| 2007/0006321 A1* | 1/2007 | Bantz | G06F 21/6218 | 726/27 |
| 2007/0055658 A1* | 3/2007 | Hsiao | G06F 16/24534 | |
| 2007/0061344 A1* | 3/2007 | Dickerman | G06F 40/18 | |
| 2007/0219956 A1* | 9/2007 | Milton | G06F 40/18 | |
| 2007/0255530 A1* | 11/2007 | Wolff | G06F 21/64 | 702/187 |
| 2007/0271502 A1* | 11/2007 | Bedi | G06F 40/186 | 715/230 |
| 2007/0276835 A1* | 11/2007 | Murthy | G06F 21/6227 | |
| 2008/0071785 A1* | 3/2008 | Kabra | G06F 21/6227 | |
| 2008/0195945 A1* | 8/2008 | Vaughan | G06F 3/0482 | 715/708 |
| 2008/0208880 A1* | 8/2008 | Dong | G06F 16/2455 | |
| 2009/0144313 A1* | 6/2009 | Hodge | G06F 17/2235 | |
| 2009/0235087 A1* | 9/2009 | Bird | G06F 21/10 | 713/190 |
| 2009/0248464 A1* | 10/2009 | Trinh | H04L 51/22 | 705/7.14 |
| 2009/0248476 A1* | 10/2009 | Trinh | G06Q 10/107 | 705/7.19 |
| 2009/0287675 A1* | 11/2009 | Dorrell | G06Q 10/06 | |
| 2010/0036836 A1* | 2/2010 | Stephens, Jr. | G06F 21/6218 | 707/783 |
| 2010/0036846 A1* | 2/2010 | Rafiq | G06F 21/6218 | 707/783 |
| 2010/0251385 A1* | 9/2010 | Fellers | H04L 9/3247 | 726/28 |
| 2010/0318570 A1* | 12/2010 | Narasinghanallur | G06F 16/252 | 707/783 |
| 2011/0088091 A1* | 4/2011 | Petronijevic | G06F 21/6209 | 726/21 |
| 2011/0219425 A1* | 9/2011 | Xiong | G06F 21/00 | 726/1 |
| 2011/0277017 A1* | 11/2011 | Ivanov | G06F 21/6218 | 726/4 |
| 2011/0321154 A1* | 12/2011 | Dau | G06F 21/6218 | 726/17 |
| 2012/0005209 A1* | 1/2012 | Rinearson | G06F 16/80 | 707/737 |
| 2012/0173963 A1* | 7/2012 | Hoke | G06F 16/9577 | 715/234 |
| 2012/0330995 A1* | 12/2012 | Muenkel | G06F 16/245 | 707/769 |
| 2013/0212059 A1* | 8/2013 | Ameri-Yahia | G06F 16/358 | 706/52 |
| 2013/0276066 A1* | 10/2013 | Buehl | H04L 63/0815 | 726/4 |
| 2014/0189483 A1* | 7/2014 | Awan | H04L 63/08 | 715/212 |
| 2014/0280377 A1* | 9/2014 | Frew | G06F 16/21 | 707/805 |
| 2014/0281870 A1* | 9/2014 | Vogel | G06F 17/246 | 715/220 |
| 2014/0283131 A1* | 9/2014 | Rozenberg | H04L 63/101 | 726/28 |
| 2014/0304824 A1* | 10/2014 | Sirohi | G06F 21/6227 | 726/26 |
| 2015/0100503 A1* | 4/2015 | Lobo | G06Q 10/103 | 705/301 |
| 2015/0135054 A1* | 5/2015 | Harley | G06F 17/241 | 715/230 |
| 2015/0193492 A1* | 7/2015 | Gunaratne | G06F 16/23 | 707/609 |
| 2015/0294270 A1* | 10/2015 | Mahavar | G06Q 10/105 | 705/320 |
| 2015/0378986 A1* | 12/2015 | Amin | G06F 40/289 | 704/9 |
| 2016/0173467 A1* | 6/2016 | Pasupuleti | H04L 65/403 | 726/5 |
| 2016/0173541 A1* | 6/2016 | Gusain | H04L 65/403 | 715/212 |
| 2016/0203225 A1* | 7/2016 | Alonso | G06Q 50/01 | 707/738 |
| 2016/0246769 A1* | 8/2016 | Screen | G06F 17/243 | |
| 2016/0342604 A1* | 11/2016 | Link | G06F 9/451 | |
| 2016/0344828 A1* | 11/2016 | Hausler | H04L 67/02 | |
| 2016/0352656 A1* | 12/2016 | Galley | G06N 3/0454 | |
| 2016/0364444 A1* | 12/2016 | Bisaga | G06F 21/6227 | |
| 2017/0116426 A1* | 4/2017 | Pattabhiraman | G06Q 10/10 | |
| 2017/0124150 A1* | 5/2017 | Zaidi | G06F 16/248 | |
| 2017/0300712 A1* | 10/2017 | Timmerman | G06F 21/6227 | |
| 2017/0353466 A1* | 12/2017 | Weaver | G06F 16/9535 | |
| 2018/0060603 A1* | 3/2018 | Ahmed | G06F 21/6227 | |
| 2018/0157467 A1* | 6/2018 | Stachura | G06F 40/109 | |
| 2019/0155912 A1* | 5/2019 | Narayanam | G06F 16/3344 | |

* cited by examiner

CONTEXT-AWARE DATA COMMENTING SYSTEM

BACKGROUND

Enterprise software systems receive, generate, and store data related to many aspects of an enterprise. Users operate reporting tools to access such data and display the data in useful formats, such as in graphic visualizations. For example, some conventional reporting tools receive user-submitted queries (e.g., Sales by Country), and present a visualization (e.g., a bar graph, a pie chart, a geomap) of a corresponding result set.

A user may wish to annotate a visualization by associating a comment with particular data of the result set. In some systems, a comment created by User A with respect to particular data may be presented to User B upon viewing the particular data. However, the comment may be presented to User B only if the viewing context of User B is determined to be the same as the viewing context of User A at the time the comment was created. Current systems for making this determination require execution of backend queries involving validating a user's data access and complex and time-consuming joins between fact and dimension tables, and may therefore consume an unsuitable amount of time and resources.

DETAILED DESCRIPTION

The following description is provided to enable any person in the art to make and use the described embodiments. Various modifications, however, will remain readily apparent to those in the art.

Figure 1:
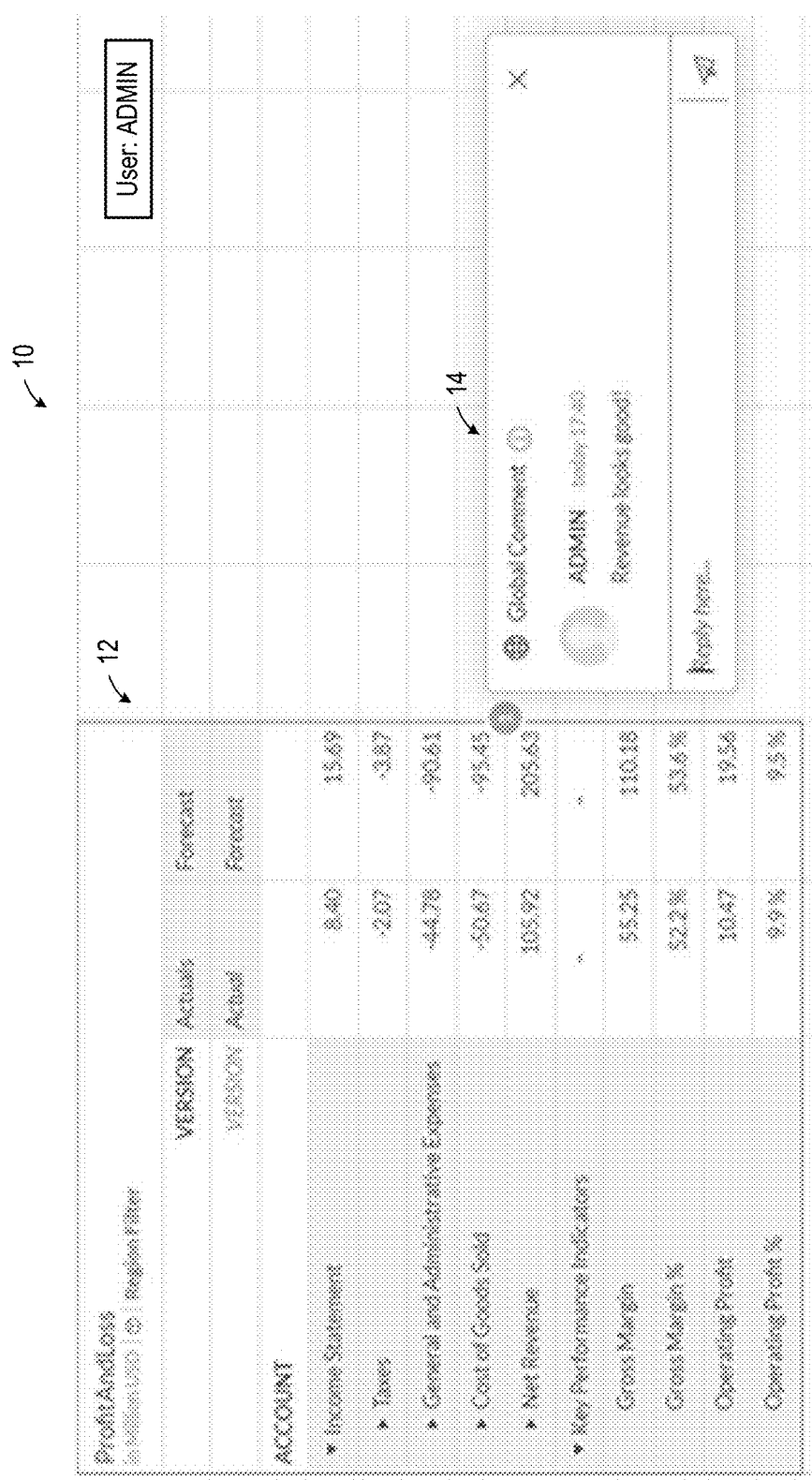
FIG. 1 is an outward view of a user interface presenting a visualization according to some embodiments.

FIG. 1 illustrates interface 10 presenting visualization 12 according to some embodiments. As will be described below, interface 10 may comprise a Web page provided by a server in response to a request from a Web browser application executing on a client device.

Visualization 12 comprises a cross-tab showing measure values aggregated over various combinations of dimension members of a ProfitAndLoss data source (e.g., an Online Analytical Processing (OLAP) cube). Each measure value is associated with a displayed dimension member of "Actual" or "Forecast", however the aggregations may also be performed over background dimension members and in view of data and role access authorizations associated with the user who is viewing interface 10, as is known in the art.

Interface 10 also includes comment window 14 presenting a comment "Revenue looks good!" created by the current user (i.e., ADMIN). The comment is associated with a particular data cell of visualization 12 which includes a particular aggregation (i.e., aggregating to the measure value 205.63. The comment may be created using any suitable user interface metaphor, for example by right-clicking on the data cell and selecting "Create Comment" from a subsequently-displayed context menu.

As mentioned above, it may be desired to present the created comment to another user in a case that the other user views a visualization including the same aggregated measure value. According to some embodiments, and in response to the creation of a comment with respect to a particular data cell, the context associated with the cell is determined and stored in association with the comment. If the visualization is viewed by another user, the comment is displayed to the other user if the viewed visualization includes a data cell having the same context as the context stored with the comment.

The context includes the intersection of the multi-dimensional data that aggregates up to the data value (i.e., 205.63). The aggregation is subject to any filters that have been applied to the visualization, to the visible (e.g. Version and Account) dimensions and background (e.g., Region) dimensions, and to any data access restrictions on the dimensions which are associated with the user. In contrast to conventional systems, some embodiments compare the contexts and authorize viewing of a comment without re-executing the analytical queries underlying the data cell with which the comment is associated.

Figure 2:
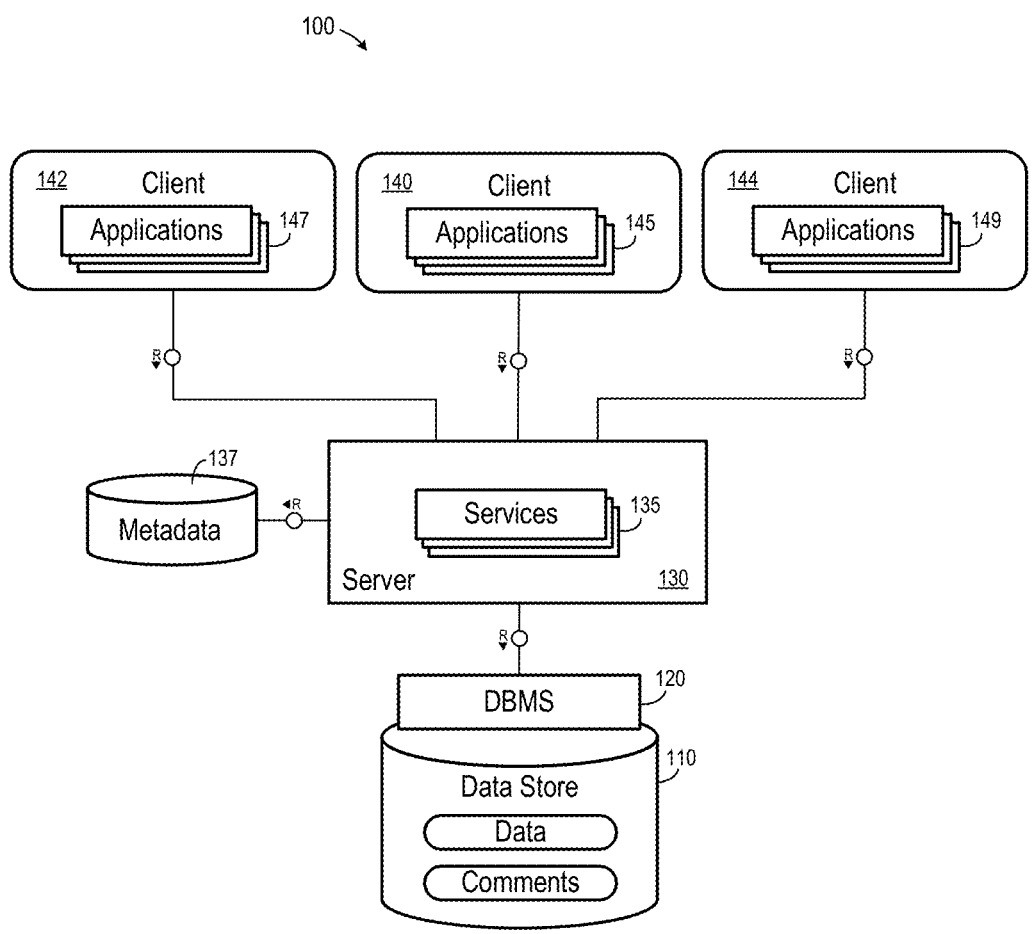
FIG. 2 is a block diagram of a system architecture according to some embodiments.

FIG. 2 is a block diagram of architecture 100 according to some embodiments. Embodiments are not limited to architecture 100 or to a database architecture.

Architecture 100 includes data store 110, database management system (DBMS) 120, server 130, services 135, metadata 137, clients 140, 142, 144 and respective applications 145, 147 and 149. Generally, services 135 executing within server 130 receive requests from applications 145, 147, 149 executing on clients 140, 142, 144 and provide results thereto based on metadata 137 and data stored within data store 110.

Server 130 may execute and provide services 135 to applications 145, 147, 149. Services 135 may comprise server-side executable program code (e.g., compiled code, scripts, etc.) which provide functionality to applications by providing user interfaces to clients, receiving requests from the applications, retrieving data from or storing data within data store 110 based on the requests, and providing responses to the applications. Services 135 may be made available for execution by server 130 via registration and/or other procedures which are known in the art.

In one specific example, client 140 executes an application 145 (e.g., a Web browser) to present a user interface to a user on a display of the client 140. The user enters a query into the user interface and the application 145 passes a request based on the query to one of services 135. An SQL script is generated based on the request and forwarded to DBMS 120. DBMS 120 executes the SQL script to return a result set based on data of data store 110, and the application 145 creates and presents a visualization based on the result set.

As described above, the visualization may include one or more user comments which are associated with data depicted in the visualization. A user may interact with application 145 to submit new comments associated with depicted data. The comments may be stored in data store 110 in association with their contexts as will be described below.

Server 130 provides any suitable protocol interfaces through which applications executing on clients may communicate with services 135 executing on application server 130. For example, server 130 may include a HyperText Transfer Protocol (HTTP) interface supporting a transient request/response protocol over Transmission Control Protocol (TCP), and/or a WebSocket interface supporting non-transient full-duplex communications between server 130 and any clients which implement the WebSocket protocol over a single TCP connection.

One or more services 135 executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 110.

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Server 130 may be separated from or closely integrated with DBMS 120. A closely-integrated server 130 may enable execution of services 135 completely on the database platform, without the need for an additional server. For example, according to some embodiments, server 130 provides a comprehensive set of embedded services which provide end-to-end support for Web-based applications. The services may include a lightweight web server, configurable support for Open Data Protocol, server-side JavaScript execution and access to SQL and SQLScript.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Metadata 137 may store metadata defining objects which are mapped to logical entities of data store 110. Each object associates one or more physical entities (e.g., a physical database table, associated columns of one or more database tables, etc.) of one or more enterprise data sources with user-friendly names. These objects may be classified as dimensions, along which one may want to perform an analysis or report (e.g., Year, Country, Product) or measures (e.g., Sales, Profit), whose values can be determined for a given combination of dimension values. Accordingly, a query received from one of clients 140 may comprise a combination of one or more measures, dimensions, dimension values and/or filters.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Each of clients 140, 142, 144 may comprise one or more devices executing program code of an application 145, 147, 149 for presenting user interfaces to allow interaction with application server 130. The user interfaces may comprise user interfaces suited for reporting, data analysis, and/or any other functions based on the data of data store 110.

Presentation of a user interface as described herein may comprise any degree or type of rendering, depending on the type of user interface code generated by server 130. For example, a client may execute a Web Browser to request and receive a Web page (e.g., in HTML format) from application server 130 via HTTP, HTTPS, and/or WebSocket, and may render and present the Web page according to known protocols. One or more clients may also or alternatively present user interfaces by executing a standalone executable file (e.g., an .exe file) or code (e.g., a JAVA applet) within a virtual machine. In another method, one of more clients execute applications loaded from server 130, that receive data and metadata by requests to services 135 executed on the server 130. Data and metadata are processed by the applications to render the user interface on the client 140.

Figure 3:
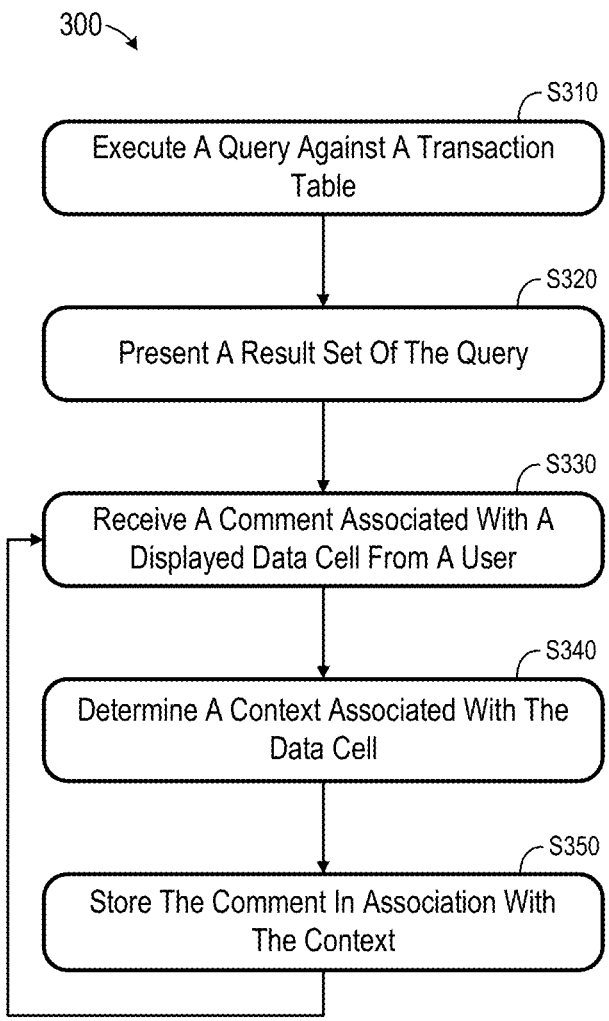
FIG. 3 comprises a flow diagram of a process to create a comment according to some embodiments.

FIG. 3 comprises a flow diagram of process 300 according to some embodiments. Process 300 may be executed to retrieve comments associated with a data point presented in a visualization. In some embodiments, various hardware elements of system 100 execute program code to perform process 300.

Process 300 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to process 300, a user submits an analytic query against a transaction, or fact, table in order to request a visualization of a result set of data. The result set consists of aggregated values determined from individual values stored within individual records of the transaction table, while taking the user's data access permissions into account. The query may comprise at least one measure or dimension.

The query is executed against the transaction table at S310. As described above, and according to some embodiments, server 130 may receive the query, generate an SQL script based on the query and on the metadata defining the dimensions and measures of the query, and forward the script to DBMS 120. DBMS 120 executes the SQL script to return a corresponding result set to an application executing on a client based on data of data store 110. The application renders and presents a visualization of the result set at S320, for example in a crosstab format.

A comment is received at S330. The comment is associated with a displayed data cell and may be input by a user as described above with respect to FIG. 1 or in any other suitable manner which associates the input comment with a data cell. Next, at S340, a context of the comment is determined.

As described above, the context may comprise the intersection of the multi-dimensional data that aggregates up to the data value associated with the comment, subject to any filters that have been applied to the visualization, to the visible (e.g. Version and Account) dimensions and background (e.g., Region) dimensions, and to any data access restrictions on the dimensions which are associated with the user. In other words, the context is a representation of the aggregation which resulted in the value displayed within the data cell at the time the comment was created.

In this regard, the returned result set may be subject to data restrictions associated with the requesting user. These restrictions may comprise data access restrictions and/or role level restrictions according to some embodiments. Data restrictions may be defined via the data model, which acts as an interface to the data and includes semantics as to how the data should be queried.

Figure 4:
FIG. 4 is an outward view of an interface illustrating a data model according to some embodiments.

FIG. 4 illustrates a "Profit and Loss" model according to some embodiments, which is composed of six key dimensions (i.e., Time, Version, Account, Region, Product, and Currency). Data access control allows a user to set restrictions on specific dimension members. For example, an administrator can restrict John to only see the United States data under the North America hierarchy.

Figure 5:
FIG. 5 is an outward view of an interface illustrating role restrictions according to some embodiments.

An administrator may also configure similar data access through role-level restrictions. For example, as illustrated in FIG. 5, an administrator can create a new role and restrict any users having that role to only see data associated with City: Los Angeles and Marital Status: single.

Accordingly, determination of the context at S340 according to some embodiments includes determining the current user and any filters currently applied to the visualization. The current user is associated with data access control settings (see, e.g., FIG. 4) and role level security settings (see, e.g., FIG. 5). Accordingly, determination of the current user may be a proxy for determination of the data access control settings and role level security settings. Alternatively, the data access control settings and role level security settings may be determined at S340 explicitly.

The comment and context are stored at S350. According to some embodiments, the context (e.g., User Identifier and filters) is stored in association with the comment, for example, among comments of data store 110. The comment and context may be stored in any manner which facilitates identification of the comment and its corresponding context.

Figure 6:
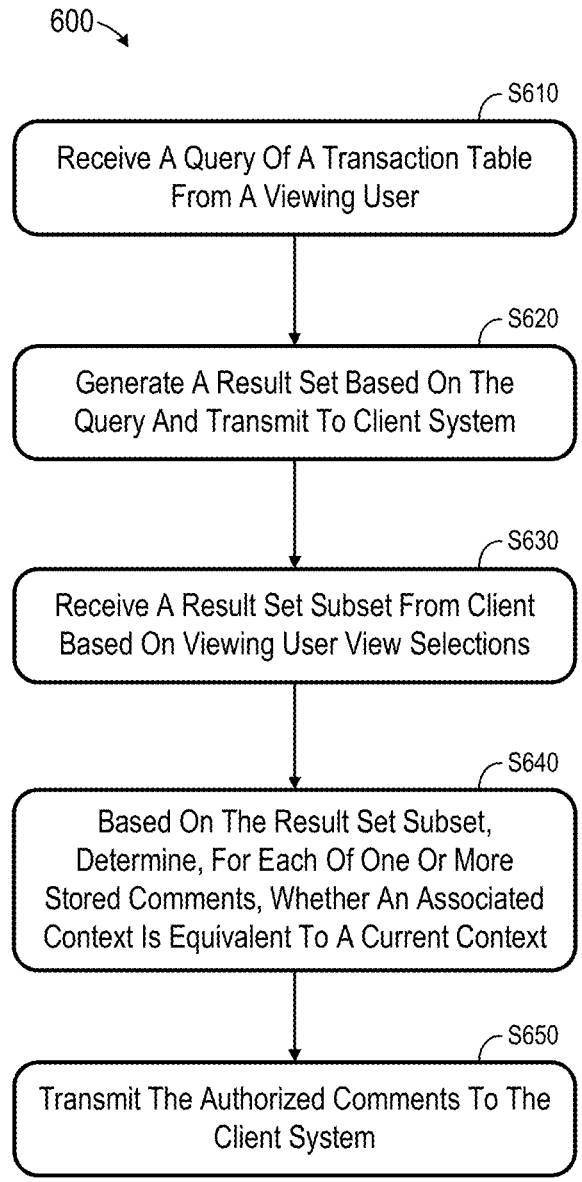
FIG. 6 comprises a flow diagram of a process to present query results according to some embodiments.

Process 600 of FIG. 6 may be executed to identify previously-stored comments and determine whether or not to display the identified comments to another user. Initially, at S610, a query of a transaction table is received from a client system operated by a viewing user. As described above, the query may comprise a request to view a visualization of a result set composed of aggregations at the intersection of one or more dimensions and/or measures of a transaction table. The result set is subject to any applied filters and the security constraints (e.g., data access control settings and role level security settings) associated with the viewing user. A result set of the query is generated and returned to the client system at S620 as is known in the art (e.g., by executing the query, formatting the result set, and returning the formatted result set to the querying client system).

As is also known in the art, the client system renders and presents a visualization of the received result set. The visualization may reflect various view selections (e.g., particular dimensions) and filters applied by the viewing user. For example, the returned result set may include many columns, but the viewing user may only be interested in viewing a much smaller subset of the columns. Moreover, the viewing user may apply filters to exclude certain rows of the result set from the visualization based on the filter criteria.

A subset of the result set is received from the client system at S630. The subset reflects the aggregated values which are actually viewed by the viewing user, in view of the current view selections of the viewing user.

Authorized comments are determined at S640 based on the result set subset. For example, as described above, the backend system may store one or more comments in association with a respective context. The stored comments may be associated with different data cells of a result set, and may have been received from different users. Each of the stored comments may therefore be associated with a different context.

Figure 8:
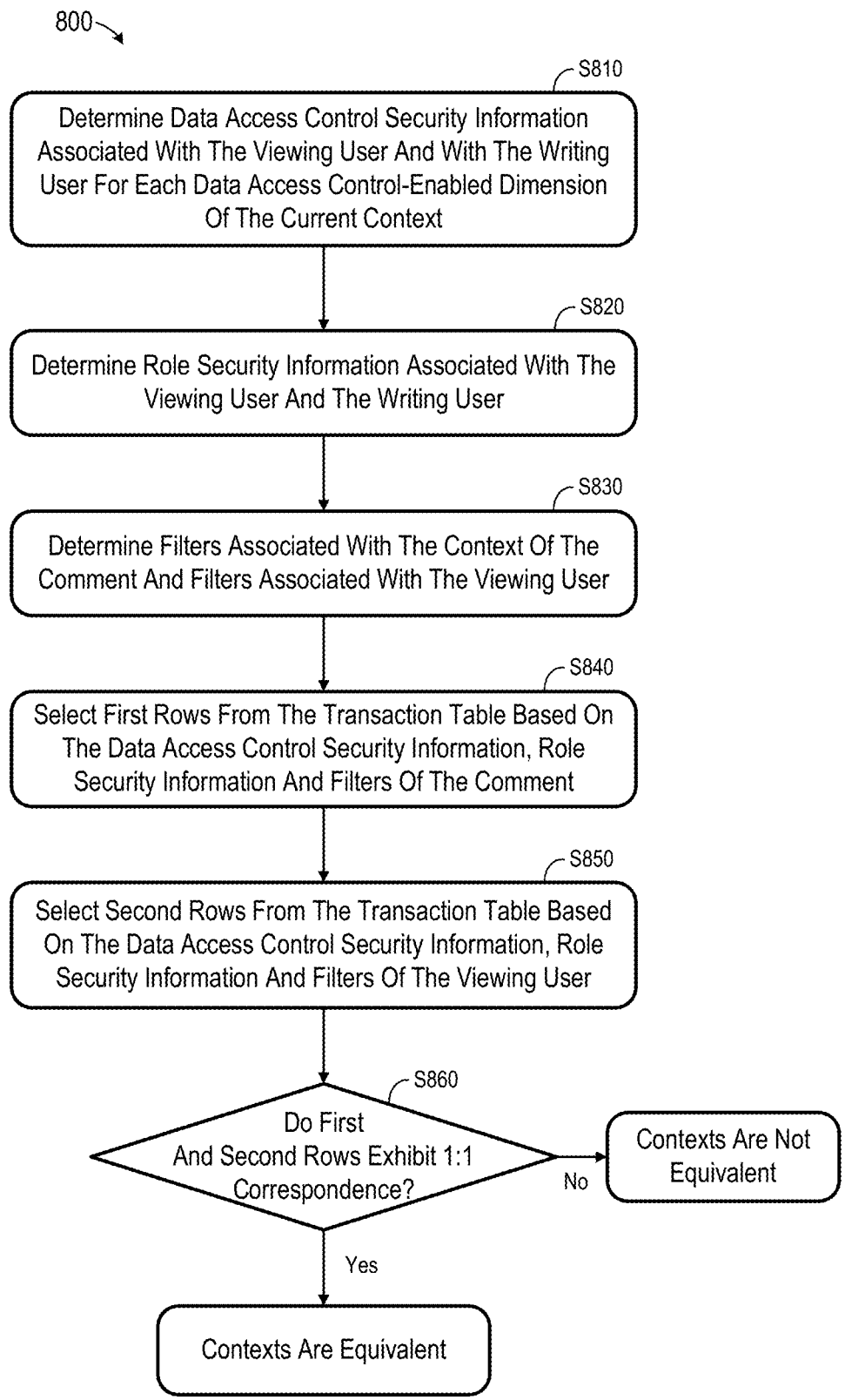
FIG. 8 comprises a flow diagram of a process to determine whether to present a comment according to some embodiments.
Figure 9:
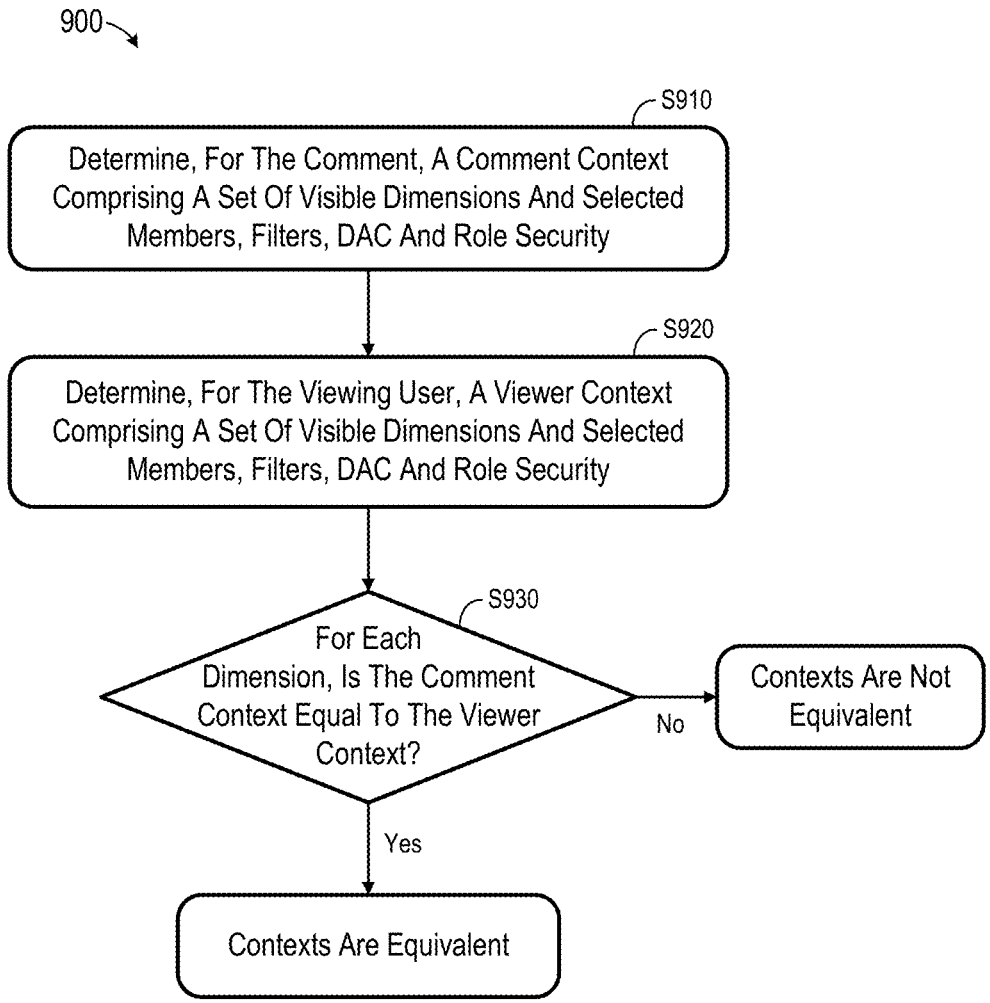
FIG. 9 comprises a flow diagram of a process to determine whether to present a comment according to some embodiments.

At S640, the result set subset is used to determine whether any of the stored comments is associated with a context that is equivalent to a current context of the viewing user. By using the result set subset, and as will be described in more detail with respect to FIGS. 8 and 9, some embodiments may identify authorized comments without executing joins between the transaction table and related dimension tables.

According to some embodiments, S640 is performed by filtering the transaction data based on the viewing user's data selection and data access, or by comparing dimension members. Process 800, described below, represents one implementation of the former approach while process 900 describes one implementation of the latter.

Any comments determined to be authorized at S640 are transmitted to the client system at S650. The client system generates a visualization including an indicator of each received comment. The visualization may be generated using any suitable system for producing a visualization of a result set of data based on a query, and may include indicators of all stored comments which were determined at S640 to be associated with a context that is equivalent to a current context. For example, if the context of a stored comment is determined to match a context of a particular data cell of the result set, an indicator of the stored comment is presented in conjunction with (e.g., adjacent to) the particular data cell of the result set.

Figure 7:
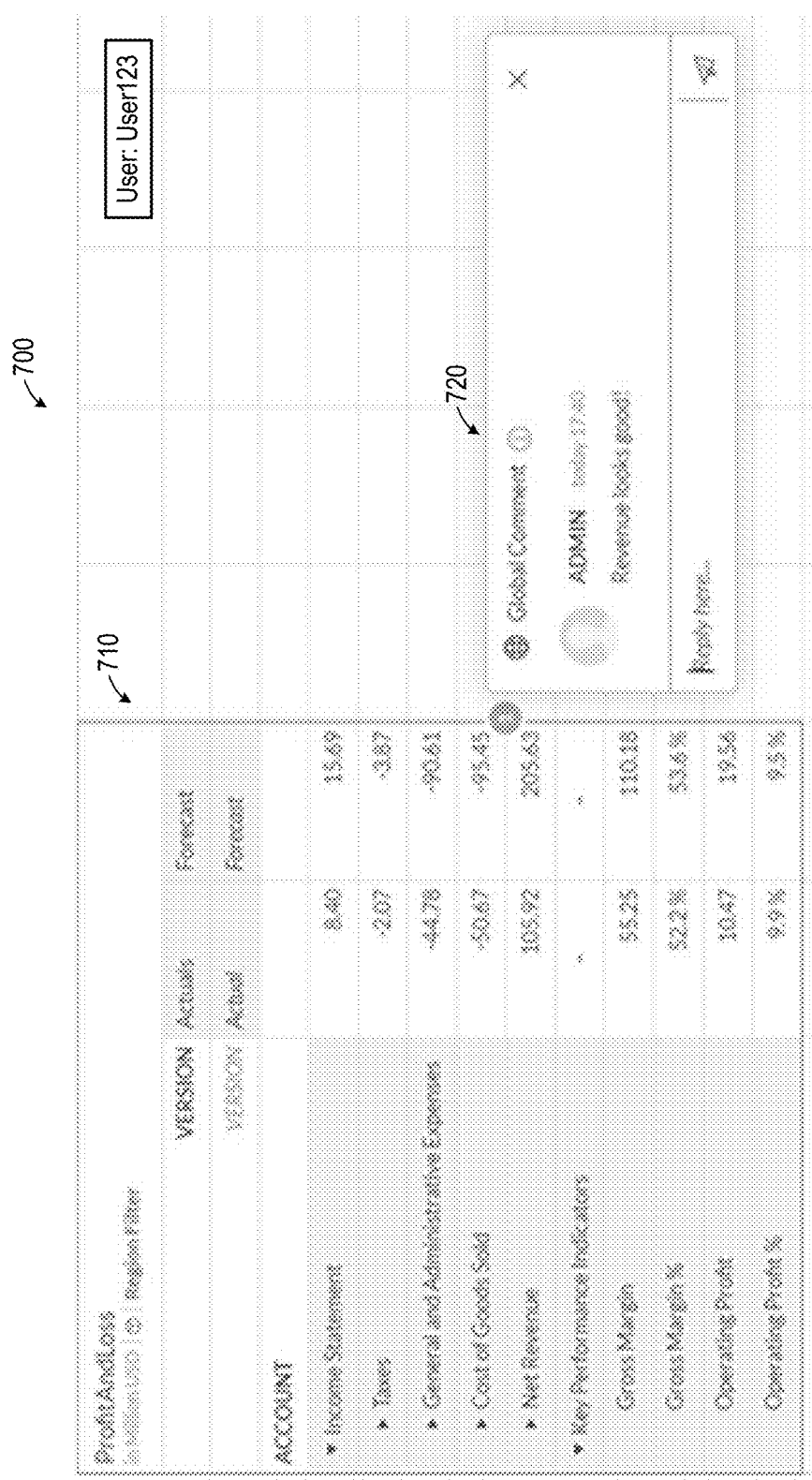
FIG. 7 is an outward view of a user interface presenting a visualization according to some embodiments.

FIG. 7 illustrates result set 710 presented at S660 according to some embodiments. Result set 710 is presented along with an indicator of comment 720, which was previously created and stored by user ADMIN as depicted in FIG. 1. In contrast, and as shown in the upper-right of interface 700, result set 710 has been requested by User123. Although only one comment indicator is shown in FIG. 7, more than one comment indicator may be presented, depending on the result of determinations performed at S640. Any suitable indicators of comments may be utilized by some embodiments. For example, an indicator may comprise a graphical icon located adjacent to the data cell or value associated with the comment, and which is selectable to cause display of the comment.

As mentioned above, FIG. 8 is a flow diagram of process 800 to determine the equivalency of a current context and a stored context of a stored comment at S640 according to some embodiments. The equivalency determination may also be considered a determination of whether the current user is authorized to view a stored comment. According to some embodiments, process 800 provides generation of WHERE clauses which may be used to directly select rows from the transaction table in order to compare the two contexts.

Initially, at S810, data access control security information associated with the viewing user is determined, for each data access control-enabled dimension of the current context. Similarly, data access control security information associated with the writing user (i.e., the user who created and stored the comment) is determined, for each data access control-enabled dimension of the current context. According to some embodiments, this information may be obtained from the data access control table of each data access control-enabled dimension. The data access control security information is converted into an SQL predicate for the transaction table associated with the query, to limit the determination of process 800 to those rows of the transaction table which the viewing user and the writing user are authorized to view per the data access control security information. For example:

"Version.ID" IN ('public.Actual') AND "Account.ID" IN ('NETREV') AND "Region.ID" IN ('REG0002') AND "Product.ID" IN ('PRD0001','PRD0002').

Next, the role security information associated with the viewing user and the writing user is determined at S820. For example, based on the viewing user's current role(s), the following role security information may be determined at S820: ("Product.ID"='PRD0001') AND ("Region.ID"='REG0001').

S830 includes determination of any filters that were applied to the table when the comment was created and stored. These filters may be determined from the stored context of the comment. In SQL, the following is an example of filters determined at S830 according to some embodiments: (("Version.ID" IN ('public.Actual')) AND (NOT ("Account.ID" IN ('COGS'))) AND ("Region.ID" IN ('REG0002'))). Also at S830, any filters applied by the viewing user are determined, for example based on the result set subset received from the client system.

At S840, first rows are selected from the transaction table based on the data access control security information, the role security information, and on any filters of the comment. At S850, second rows are selected from the transaction table based on the data access control security information, the role security information, and on any filters applied by the viewing user. The first and second rows are compared to determine whether a 1:1 correspondence exists at S860. If such a correspondence exists, it is determined that the contexts are equivalent and the viewing user is authorized to view the comment.

According to some embodiments, S840-S860 may comprise executing SQL statements, including the SQL predicates determined at S810-S830, which select the first rows and the second rows, perform a full join of the first and second rows, and count the number of null-value rows that result. If the count equals 0, the viewing user is authorized to view the comment. According to one non-exhaustive example of S840-S860:

```
WITH TRNS
AS (SELECT DISTINCT D0.*, D1.*, D2.*, D3.*, D4.*
FROM "TENANT_TEST"."t.TEST.CommentingModel::TRNS_CommentingModel" T
JOIN "_SYS_BIC"."t.TEST.t.TEST.CommentingModel/Version" D0
ON D0."Version.ID" = T."Version.ID"
JOIN "_SYS_BIC"."t.TEST.t.TEST.CommentingModel/Account" D1
ON D1."Account.ID" = T."Account.ID"
JOIN "_SYS_BIC"."t.TEST.t.TEST.CommentingModel/Region" D2
ON D2."Region.ID" = T."Region.ID"
JOIN "_SYS_BIC"."t.TEST.t.TEST.CommentingModel/Product" D3
ON D3."Product.ID" = T."Product.ID"
JOIN "_SYS_BIC"."t.TEST.t.TEST.CommentingModel/Time" D4
ON D4."Time.CALMONTH" = T."Time.CALMONTH"),
TRNS_FULL
AS (SELECT DISTINCT "Version.ID",
"Account.ID",
"Region.ID",
"Product.ID",
"Time.CALMONTH"
FROM TRNS
WHERE (("Version.ID" IN ( 'public.Actual' ) ))),
CTE0
AS (SELECT "Version.ID",
"Account.ID",
"Region.ID",
"Product.ID",
"Time.CALMONTH"
FROM TRNS
WHERE "Account.ID" IN ( 'COGS', 'NETREV' )
AND "Product.ID" IN ( 'PRD0001' )
AND (( "Version.ID" IN ( 'public.Actual' ) )))
SELECT Count(*)
FROM (SELECT *
FROM TRNS_FULL
WHERE "Account ID" IN ( 'COGS', 'NETREV' )
AND "Product.ID" IN ( 'PRD0001' )) CTE_CURRENT
FULL JOIN CTE0
ON CTE0."Version.ID" = CTE_CURRENT."Version.ID"
AND CTE0."Account.ID" = CTE_CURRENT."Account.ID"
AND CTE0."Region.ID" = CTE_CURRENT."Region.ID"
AND CTE0."Product.ID" = CTE_CURRENT."Product.ID"
AND CTE0."Time.CALMONTH" = CTE_CURRENT."Time.CALMONTH"
WHERE ( CTE_CURRENT."Version.ID" IS NULL )
OR ( CTE0."Version.ID" IS NULL )
```

Although significantly more efficient than existing systems, process 800 filtering the transaction data based on the user's data selection and data access, which may require more processing in the backend server to compute the result than desired. Process 900 may implement S640 of process 600 differently by assuming that if the comment author (Writer) and the viewing user (Reader) have access to the same set of dimension members that are in the comment context, the contexts are equivalent and the comment should be presented to viewing user. Accordingly, process 900 includes running queries against the relevant dimension tables, rather than against the transaction table.

A context of the comment is determined at S910. The comment context includes a set of visible dimensions and selected members, filters, and the data access control and role level security information mentioned above. Similarly, at S920, a viewer context is determined consisting of visible dimensions and selected members, filters, and the data access control and role level security information. Data access and role level security information is obtained in the server side. This information is combined with the visible dimensions, and selected members, filters on the client side to form the full context. The visible dimensions and selected members, filters may be determined from the result set subset received from the client system at S630.

Next, at S930, it is determined whether the comment context (i.e., the Writer's Context) is equal to the viewer context (i.e., the Reader's Context). For each Dimension$_i$, the Writer's Context is denoted as Context$_w$=Tuple$_w$ ∩ Filter$_w$ ∩ DAC$_w$ ∩ Role$_w$=T$_w$ ∩ F$_w$ ∩ D$_w$ ∩ R$_w$=T$_w$ ∩ C$_w$, and the Reader's Context is denoted as Context$_r$=Tuple$_w$ ∩ Filter$_r$ ∩ DAC$_r$ ∩ Role$_r$=T$_w$ ∩ F$_r$ ∩ D$_r$ ∩ R$_r$=T$_w$ ∩ C$_r$.

T$_w$ represents leaf nodes on which the comment was placed at the time of writing the comment. T$_w$ does not consider any data access control information or filters, only the leaf nodes that exist in the hierarchy. Therefore, T$_w$ is the same for the Reader's Context and the Writer's Context.

If Dimension$_i$ is a background dimension and T$_w$ is unavailable but C$_w$ is available, then U$_w$ (the set of all dimension members) is stored as T$_w$. If Context$_w$ is to be updated when the dimension changes, it may not be necessary to store U$_w$. The tuple dimension hierarchy view (default hierarchy for U$_w$) is used to acquire the leaf nodes. The query to acquire T$_w$ is run once per dimension at the time of writing the comment, for example:

```
SELECT "RESULT_NODE_NAME"
    FROM "_SYS_BIC"."t.TEST.sap.epm/Account/hier/parentId"('expression'='leaves(nodes( ))')
    -- Dimension hierarchy view
    WHERE "QUERY_NODE_NAME" = ?
```

F$_w$ represents leaf nodes of the filter on the data region at write time. Multiple filters may be expressed as F$_{w1}$ ∩ F$_{w2}$ ∩ . . . . In a case that a dimension is filtered by multiple filters (e.g., story filter, page filter, dimension filter), the leaf nodes for each such filter are acquired and combined. Each filter hierarchy view is queried to acquire the leaf nodes. The query to acquire F$_w$ is similar to the query used to acquire T$_w$, for example:

```
SELECT "RESULT_NODE_NAME"
FROM "_SYS_BIC"."t.TEST.sap.epm/Account/hier/parentId"('expression'='leaves(nodes( ))')
-- Dimension hierarchy view
WHERE "QUERY_NODE_NAME" = ?
```

If the filter is an exclude filter, it is converted to an include filter by running: $T_w-F_w$. For example, include filter: $T_w \cap F_w \cap D_w \cap R_w = T_w \cap C_w$; and exclude filter: $T_w-F_w \cap D_w \cap R_w = T_w \cap T_w-F_w \cap D_w \cap R_w = T_w \cap (T_w-F_w) \cap D_w \cap R_w = T_w \cap C_w$.

$D_w$ represents the leaf nodes of data access control for the writer at comment write time. For example, the following query may be used to acquire $D_w$ for the Account dimension:

```
SELECT DAC."MEMBER"
FROM "TENANT_TEST"."sap.epm::DAC_Account" DAC
JOIN "TENANT_TEST"."sap.epm/Account/parentId" HIER ON DAC."MEMBER" =
HIER."QUERY_NODE_NAME"
WHERE HIER."IS_LEAF" = 1
AND DAC."USER" = ?
```

$R_w$ represents the leaf nodes of the role for Dimension$_i$ for the writer at comment write time. The query to acquire $R_w$ may be as follows, and the result of this query is parsed to extract the members for each dimension:

```
SELECT "DEFINITION"
FROM "TENANT_TEST"."sap.fpa.services.security::T_EffectiveDataAccess_"
\WHERE "CUBE_NAME" = ?
\AND "USER_NAME" = ?
[
  {
    "dimension": "sap.epm:Account",
    "property": "ID",
    "key": "sap.epm:Account\tID\tsap.epm",
    "packageName": "sap.epm",
    "operator": "=",
    "value": "500000; 400000; 410110; 410120",
    "dimMd": {
    "idField": "ID",
    "masterDataTableNoSchema": "sap.epm::MSTR_Account",
    "schema": "TENANT_TEST"
  }
  },
  {
    "dimension": "sap.epm:Region",
    "property": "ID",
    "key": "sap.epm:Region\tID\tsap.epm",
    "packageName": "sap.epm",
    "operator": "=",
    "value": "REG0001;REG0002;REG0004",
    "high":
    "dimMd": {
      "idField": "ID",
      "masterDataTableNoSchema": "sap.epms::MSTR_Region",
      "schema": "TENANT_TEST"
    }
  }
]
```

$C_w$ may equal $F_w \cap D_w \cap R_w$. To save time and space, $F_w \cap D_w \cap R_w$ may be stored together as $C_w$. $F_r$ represents leaf nodes of the filter on data region at read time. The query to acquire $F_r$ may be similar to the same query to acquire $F_w$. The query may be executed once per data region during comment read time to determine whether the comment is authorized.

$D_r$ represents leaf nodes of DAC for the reader at read time. The query to acquire $D_r$ is similar to that for $D_w$, and may be run once per model. $R_r$ represents leaf nodes of the role for Dimension$_i$ for the reader at read time. The query to acquire $R_r$ is similar to that for $R_w$ and may be run once per model.

$C_r$ may equal $F_r \cap D_r \cap R_r$, and calculation of $C_r$ is similar to calculation of $C_w$. $C_r$ may be calculated once per data region.

S930 may therefore comprise an evaluation of whether, for each Dimension$_i$ in the thread context: Context$_w$=Context$_r$, or, using the notation above, $T_w \cap C_w = T_w \cap C_r$.

Figure 10:
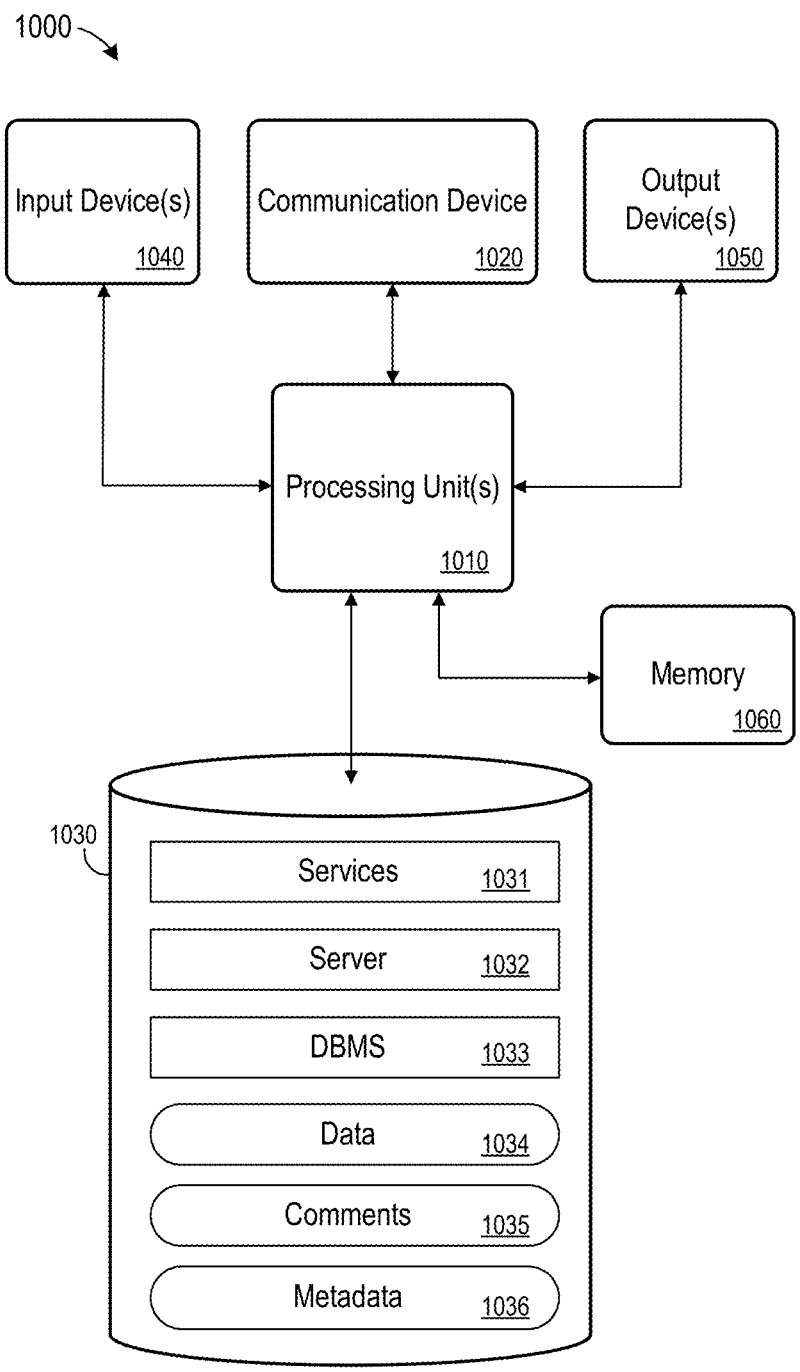
FIG. 10 a block diagram of an apparatus according to some embodiments.

FIG. 10 is a block diagram of apparatus 1000 according to some embodiments. Apparatus 1000 may comprise a general-purpose computing apparatus and may execute program code to perform any of the functions described herein.

Apparatus 1000 may comprise an implementation of server 130, DBMS 120 and data store 110 of FIG. 2 in some embodiments. Apparatus 1000 may include other unshown elements according to some embodiments.

Apparatus 1000 includes processing unit(s) 1010 operatively coupled to communication device 1020, data storage device 1030, one or more input devices 1040, one or more output devices 1050 and memory 1060. Communication device 1020 may facilitate communication with external devices, such as a reporting client, or a data storage device. Input device(s) 1040 may comprise, for example, a keyboard, a keypad, a mouse or other pointing device, a microphone, knob or a switch, an infra-red (IR) port, a docking station, and/or a touch screen. Input device(s) 1040 may be used, for example, to enter information into apparatus 1000. Output device(s) 1050 may comprise, for example, a display (e.g., a display screen) a speaker, and/or a printer.

Data storage device 1030 may comprise any appropriate persistent storage device, including combinations of magnetic storage devices (e.g., magnetic tape, hard disk drives and flash memory), optical storage devices, Read Only Memory (ROM) devices, etc., while memory 1060 may comprise Random Access Memory (RAM), Storage Class Memory (SCM) or any other fast-access memory.

Services 1031, server 1032 and DBMS 1033 may comprise program code executed by processor 1010 to cause apparatus 1000 to perform any one or more of the processes described herein. Embodiments are not limited to execution of these processes by a single apparatus.

Data 1034, comments 1035 and metadata 1036 (either cached or a full database) may be stored in volatile memory such as memory 1060. Comments 1035 may include comment contexts as described herein. Metadata 1035 may include dimension names, dimension hierarchies, data access control information, and role level security information. Data storage device 1030 may also store data and other program code for providing additional functionality and/or which are necessary for operation of apparatus 1000, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable process steps; and
a processor to execute the processor-executable process steps to cause the system to:
receive a first query of a transaction table from a first client system;
generate a first result set based on the first query;
transmit the first result set to the first client system;
receive a first subset of the first result set from the first client system, the first subset of the first result set comprising data values of the first result set viewed by a first user based on view selections by the first user, the first subset comprising fewer data values than the first result set;
determine a first user context based on the first subset of the first result set;
determine whether to present a first stored comment associated with the first subset of the first result set to the first user based on a comparison between the first user context and a first comment context associated with a writer of the first stored comment;
the first comment context representing a writer aggregation value displayed within a data cell at a time of creation of the first stored comment;
the first comment context based on a first formula including:

$$Tuple_w \cap Filter_w \cap DAC_w \cap Role_w = T_w \cap F_w \cap D_w \cap R_w = T_w \cap C_w;$$

the first user context based on a second formula including:

$$Tuple_w \cap Filter_r \cap DAC_r \cap Role_r = T_r \cap F_r \cap D_r \cap R_r = T_r \cap C_r;$$

where:
$C_r$ represents a context of the first user;
$C_w$ represents a context of the writer of the first stored comment;
$Tuple_w$ represents leaf nodes on which the comment was placed at the time of writing the first stored comment, without consideration of data access control information and filters;
Filter represents filters applied to visible dimensions and background dimensions of one or members of the first subset;
DAC represents a respective data access control security setting;
Role represents a respective role level security setting; and
transmit, in an instance it is determined to present the first stored comment to the first user, the first stored comment to the first client system.

2. A system according to claim 1, wherein the first context associated with the first stored comment comprises:
an identifier of a second user, the second user having created the first stored comment, and first dimensions of a first data value associated with the first stored comment, and
wherein the first user context comprises an identifier of the first user and visible dimensions of the first subset of the first result set.

3. A system according to claim 1, wherein determination of whether to present the first stored comment to the first user comprises:
selection of first rows from the transaction table based on data access control security information associated with the first stored comment, role security information associated with the first stored comment, and filters applied during creation of the first stored comment;
selection of second rows from the transaction table based on data access control information associated with the first user, role security information associated with the first user and filters applied to the first result set by the first user to view the first subset; and
comparison of the first rows and the second rows.

4. A system according to claim 1, wherein determination of whether to present the first stored comment to the first user comprises:
determination of the first comment context comprising a first set of visible dimensions and selected dimension members, a first one or more filters, first data access control information and first role security information;
determination of the first user context comprising a second set of visible dimensions and selected dimension members, a second one or more filters, second data access control information and second role security information; and determination, for each dimension, of whether the first comment context is equal to the first user context.

5. A system according to claim 4, wherein determination, for each dimension, of whether the first comment context is equal to the first user context does not comprise querying of the transaction table.

6. A system according to claim 1, the processor to execute the processor-executable process steps to cause the system to:

receive a second query of the transaction table from a second client system;

generate a second result set based on the second query;

transmit the second result set to the second client system;

receive a first subset of the second result set from the second client system, the first subset of the second result set comprising data values of the second result set viewed by a second user based on current view selections by the first user, the first subset of the second result set comprising fewer data values than the second result set;

determine a second user context based on the first subset of the second result set;

determine whether to present the first stored comment associated with the first subset of the second result set to the second user based on a comparison between the second user context and the first comment context associated with the writer of the first stored comment, and on data security information associated with the second user; and transmit in an instance it is determined to present the first stored comment to the second user, the first stored comment to the second client system.

7. A system according to claim 1, the processor to execute the processor-executable process steps to cause the system to:

determine whether to present a second stored comment associated with the first subset of the first result set to the first user based on a comparison between the first user context and a second comment context associated with a writer of the second stored comment; and transmit in an instance it is determined to present the second stored comment to the first user, the second stored comment to the first client system.

8. A method according to claim 1, further comprising:

receiving a second query of the transaction table from a second client system;

generating a second result set based on the second query;

transmitting the second result set to the second client system;

receiving a first subset of the second result set from the second client system, the first subset of the second result set comprising data values of the second result set viewed by a second user based on current view selections by the first user, the first subset of the second result set comprising fewer data values than the second result set;

determining a second user context based on the first subset of the second result set;

determining whether to present the first stored comment associated with the first subset of the second result set to the second user based on a comparison between the first user context and the first comment context associated with the writer of the first stored comment, and on data security information associated with the second user; and transmit in an instance it is determined to present the first stored comment to the second user, transmitting the first stored comment to the second client system.

9. A computer-implemented method comprising:

receiving a first query of a transaction table from a first client system;

generating a first result set based on the first query;

transmitting the first result set to the first client system;

receiving a first subset of the first result set from the first client system, the first subset of the first result set comprising data values of the first result set viewed by a first user based on view selections by the first user, the first subset comprising fewer data values than the first result set;

determining a first user context based on the first subset of the first result set;

determining whether to present a first stored comment associated with the first subset of the first result set to the first user based on a comparison between the first user context and a first context associated with a writer of the first stored comment;

the first comment context representing a writer aggregation value displayed within a data cell at a time of creation of the first stored comment;

the first comment context based on a first formula including:

$$Tuple_w \cap Filter_w \cap DAC_w \cap Role_w = T_w \cap F_w \cap D_w \cap R_w = T_w \cap C_w;$$

the first user context based on a second formula including:

$$Tuple_w \cap Filter_r \cap DAC_r \cap Role_r = T_r \cap F_r \cap D_r \cap R_r = T_r \cap C_r;$$

where:

$C_r$ represents a context of the first user;

$C_w$ represents a context of the writer of the first stored comment;

$Tuple_w$ represents leaf nodes on which the comment was placed at the time of writing the first stored comment, without consideration of data access control information and filters;

Filter represents filters applied to visible dimensions and background dimensions of one or members of the first subset;

DAC represents a respective data access control security setting;

Role represents a respective role level security setting; and transmit, in an instance it is determined to present the first stored comment to the first user, the first stored comment to the first client system.

10. A method according to claim 9, wherein the first context associated with the first stored comment comprises:

an identifier of a second user, the second user having created the first stored comment, and first dimensions of a first data value associated with the first stored comment, and wherein the first user context comprises an identifier of the first user and visible dimensions of the first subset of the first result set.

11. A method according to claim 9, wherein determining whether to present the first stored comment to the first user comprises:

selecting first rows from the transaction table based on data access control security information associated with the first stored comment, role security information associated with the first stored comment, and filters applied during creation of the first stored comment;

selecting second rows from the transaction table based on data access control information associated with the first user, role security information associated with the first user and filters applied to the first result set by the first user to view the first subset; and comparing the first rows and the second rows.

12. A method according to claim 9, wherein determining whether to present the first stored comment to the first user comprises:

determining the first comment context comprising a first set of visible dimensions and selected dimension members, a first one or more filters, first data access control information and first role security information;

determining the first user context comprising a second set of visible dimensions and selected dimension members, a second one or more filters, second data access control information and second role security information; and determining, for each dimension, of whether the first comment context is equal to the first user context.

13. A method according to claim 12, wherein determining, for each dimension, whether the first comment context is equal to the first user context does not comprise querying the transaction table.

14. A method according to claim 9, further comprising:

determining whether to present a second stored comment associated with the first subset of the first result set to the first user based on a comparison between the first user context and a second comment context associated with a writer of the second stored comment; and transmit in an instance it is determined to present the second stored comment to the first user, transmitting the second stored comment to the first client system.

15. A non-transitory computer-readable medium storing program code, the program code executable by a processor of a computing system to cause the computing system to:

receive a first query of a transaction table from a first client system;

generate a first result set based on the first query;

transmit the first result set to the first client system;

receive a first subset of the first result set from the first client system, the first subset of the first result set comprising data values of the first result set viewed by a first user based on view selections by the first user, the first subset comprising fewer data values than the first result set;

determine a first user context based on the first subset of the first result set;

determine whether to present a first stored comment associated with the first subset of the first result set to the first user based on a comparison between the first user context and a first context associated with a writer of the first stored comment;

the first comment context representing a writer aggregation value displayed within a data cell at a time of creation of the first stored comment;

the first comment context based on a first formula including:

$$Tuple_w \cap Filter_w \cap DAC_w \cap Role_w = T_w \cap F_w \cap D_w \cap R_w = T_w \cap C_w;$$

the first user context based on a second formula including:

$$Tuple_w \cap Filter_r \cap DAC_r \cap Role_r = T_r \cap F_r \cap D_r \cap R_r = T_r \cap C_r;$$

where:

$C_r$ represents a context of the first user;

$C_w$ represents a context of the writer of the first stored comment;

$Tuple_w$ represents leaf nodes on which the comment was placed at the time of writing the first stored comment, without consideration of data access control information and filters;

Filter represents filters applied to visible dimensions and background dimensions of one or members of the first subset;

DAC represents a respective data access control security setting;

Role represents a respective role level security setting; and transmit, in an instance it is determined to present the first stored comment to the first user, the first stored comment to the first client system.

16. A medium according to claim 15, wherein determination of whether to present the first stored comment to the first user comprises:

determination of the first comment context comprising a first set of visible dimensions and selected dimension members, a first one or more filters, first data access control information and first role security information;

determination of the first user context comprising a second set of visible dimensions and selected dimension members, a second one or more filters, second data access control information and second role security information; and determination, for each dimension, of whether the first comment context is equal to the first user context.

17. A medium according to claim 16, wherein determination, for each dimension, of whether the first comment context is equal to the first user context does not comprise querying of the transaction table.

* * * * *